（12）United States Patent
Kawabata et al.

(10) Patent No.: US 10,999,078 B2
(45) Date of Patent: May 4, 2021

(54) SOFTWARE DISTRIBUTION PROCESSING DEVICE, SOFTWARE DISTRIBUTION PROCESSING METHOD, AND VEHICLE

(71) Applicant: KDDI CORPORATION, Tokyo (JP)

(72) Inventors: Hideaki Kawabata, Tokyo (JP);
Seiichiro Mizoguchi, Tokyo (JP);
Ayumu Kubota, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 132 days.

(21) Appl. No.: 15/737,540

(22) PCT Filed: Jul. 1, 2016

(86) PCT No.: PCT/JP2016/069660
§ 371 (c)(1),
(2) Date: Dec. 18, 2017

(87) PCT Pub. No.: WO2017/006862
PCT Pub. Date: Jan. 12, 2017

(65) Prior Publication Data
US 2018/0183605 A1      Jun. 28, 2018

(30) Foreign Application Priority Data

Jul. 3, 2015    (JP) ............................. JP2015-134427

(51) Int. Cl.
*H04L 9/32*       (2006.01)
*G09C 1/00*       (2006.01)
(Continued)

(52) U.S. Cl.
CPC ............ *H04L 9/3247* (2013.01); *B60R 16/02* (2013.01); *G06F 8/61* (2013.01); *G06F 8/65* (2013.01);
(Continued)

(58) Field of Classification Search
CPC ... H04L 63/123; H04L 9/3247; H04L 9/0825; H04L 2012/40215; H04L 67/12; H04L 67/34; H04L 2209/84
See application file for complete search history.

(56) References Cited

U.S. PATENT DOCUMENTS 9,215,228 B1 *   12/2015   Zhang ................... H04L 9/0833
9,331,854 B2 *   5/2016    Oguma ................. H04L 9/3242
(Continued)

FOREIGN PATENT DOCUMENTS

CN           103744706 A      4/2014
JP           2005-259028 A    9/2005
(Continued)

OTHER PUBLICATIONS

Miller et al., "Adventures in Automotive Networks and Control Units", DEF CON 21, Aug. 2013, pp. 1-99.
(Continued)

*Primary Examiner* — Tae K Kim
(74) *Attorney, Agent, or Firm* — Greenblum & Bernstein, P.L.C.

(57) ABSTRACT

A software distribution processing device stores a common key for each ECU and a verification key for an electronic signature of software updating data, verifies an electronic signature of the updating data received from management server equipment by use of the verification key, attaches an electronic signature using the common key for each ECU to the updating data succeeded in verification of the electronic signature, and then transmits to each ECU the updating data attached with the electronic signature using the common key for each ECU.

7 Claims, 5 Drawing Sheets

(51) Int. Cl.
*H04L 9/16* (2006.01)
*B60R 16/02* (2006.01)
*G06F 21/64* (2013.01)
*G06F 21/57* (2013.01)
*G06F 8/61* (2018.01)
*G06F 8/65* (2018.01)
*H04L 9/08* (2006.01)
*H04L 29/06* (2006.01)

(52) U.S. Cl.
CPC ............ *G06F 21/572* (2013.01); *G06F 21/64* (2013.01); *G09C 1/00* (2013.01); *H04L 9/0819* (2013.01); *H04L 9/16* (2013.01); *H04L 9/32* (2013.01); *H04L 63/0428* (2013.01)

(56) References Cited

U.S. PATENT DOCUMENTS

| | | | |
|---|---|---|---|
| 2006/0143474 A1* | 6/2006 | Knechtel | G06F 21/33 713/189 |
| 2013/0145159 A1* | 6/2013 | Nakaoka | H04L 9/3247 713/161 |
| 2013/0182844 A1* | 7/2013 | Nagai | H04L 9/16 380/259 |
| 2014/0075197 A1 | 3/2014 | Alrabady et al. | |
| 2014/0075517 A1* | 3/2014 | Alrabady | G06F 21/572 726/4 |
| 2014/0114497 A1* | 4/2014 | Miyake | H04L 9/32 701/1 |
| 2014/0279985 A1 | 9/2014 | Fontenot et al. | |
| 2014/0297109 A1* | 10/2014 | Shimomura | H04L 67/125 701/36 |
| 2015/0121071 A1* | 4/2015 | Schwarz | H04L 63/08 713/168 |
| 2015/0121457 A1* | 4/2015 | Schwarz | G06F 21/44 726/3 |
| 2015/0156021 A1 | 6/2015 | Shiota et al. | |
| 2015/0180840 A1* | 6/2015 | Jung | H04L 67/34 713/150 |
| 2015/0200804 A1* | 7/2015 | Lee | H04L 67/12 709/221 |
| 2016/0112215 A1* | 4/2016 | Lee | H04L 12/4625 370/235 |
| 2016/0173505 A1* | 6/2016 | Ichihara | H04L 67/12 713/170 |
| 2016/0285863 A1* | 9/2016 | Canavor | H04L 63/0823 |
| 2016/0297401 A1* | 10/2016 | Haga | H04L 9/3242 |
| 2016/0344552 A1* | 11/2016 | Sharma | G06F 21/85 |
| 2016/0344703 A1* | 11/2016 | Sharma | H04L 63/0428 |
| 2016/0378457 A1* | 12/2016 | Adachi | H04L 63/123 713/181 |
| 2017/0134164 A1* | 5/2017 | Haga | B60R 16/023 |
| 2018/0006819 A1* | 1/2018 | Watanabe | G06F 21/31 |

FOREIGN PATENT DOCUMENTS

| | | |
|---|---|---|
| JP | 2007-527044 A | 9/2007 |
| JP | 2008-226159 A | 9/2008 |
| JP | 103744706 A | 4/2014 |
| JP | 2014-191659 A | 10/2014 |
| JP | 2015-103163 A | 6/2015 |
| JP | 2015-122704 A | 7/2015 |
| WO | 2010/041462 A1 | 4/2010 |

OTHER PUBLICATIONS

Yoshioka et al., "New Attestation Based Security Protocol for In-vehicle Communication", Symposium on Multimedia, Distributed Cooperative and Mobile Systems (DICOMO2008) Ronbunshu vol. 2008, No. 1.02, along with partial English language translation, Jul. 2, 2008, pp. 1270-1275.

Ikeno et al., "Current Cryptography", 1st edition, The Institute of Electronics, Information and Communication Engineers, along with partial English language translation, Sep. 1, 1986, pp. 217-220.

Int'l Search Report issued in International Bureau of WIPO Patent Application No. PCT/JP2016/069660, dated Sep. 20, 2016, along with an English translation thereof.

Official Communication issued in Japan Patent Application No. 2015-134427, dated May 9, 2017, along with an English translation thereof.

Notice of Allowance issued in Japanese Patent Application No. 2017-158158, dated Oct. 23, 2018, along with an English translation thereof.

Search Report issued in European Patent Office (EPO) Patent Application No. 16821331.2, dated Nov. 13, 2018.

May 7, 2020 Chinese Office Action in corresponding Chinese Application No. 201680037406.4 and partial English translation thereof.

* cited by examiner

SOFTWARE DISTRIBUTION PROCESSING DEVICE, SOFTWARE DISTRIBUTION PROCESSING METHOD, AND VEHICLE

TECHNICAL FIELD

The present invention relates to a software distribution processing device, a vehicle, a software distribution processing method, and a computer program.

The present application claims the benefit of priority on Japanese Patent Application No. 2015-134427 filed on Jul. 3, 2015, the subject matter of which is hereby incorporated herein by reference.

BACKGROUND ART

Recently, automobiles have been equipped with on-board control systems and designed to control basic operations of automobiles such as running, stopping, and turning operations and other applied operations by use of on-board control systems.

In general, each on-board control system may be equipped with twenty to one-hundred on-board control microprocessors referred to as ECUs (Electronic Control Units). The ECU is one type of computer configured to achieve desired functions using computer programs. The ECUs are connected to a CAN (Controller Area Network) serving as a communication network, and therefore they may cooperate with each other.

In addition, automobiles have been equipped with interfaces for diagnostic ports referred to as OBD (On-Board Diagnostics) ports connected to ECUs. A diagnostic terminal exclusively designed for maintenance is connected to an OBD port, and therefore it is possible for the diagnostic terminal to install update programs and to change settings of data with respect to ECUs. Normally, workers of authorized dealerships (dealers) or automobile maintenance workshops may update computer programs with ECUs in vehicle inspection or regular inspection of vehicles.

For example, Non-Patent Literatures 1, 2 disclose security for on-board control systems of vehicles.

CITATION LIST

Non-Patent Literature

Non-Patent Literature 1: C. Miller, C. Valasek, "Adventures in Automobile Network and Control Units", DEF CON 21, August 2013

Non-Patent Literature 2: Akira Yoshioka, Hisashi Koguma, Makoto Nishikawa, Rie Sigetomi, Akira Otsuka, Hideki Imai, "Suggestion for In-Vehicle Communication Protocol with Attestation Function"

SUMMARY OF INVENTION

Technical Problem

It is preferable to improve reliability in managing computer programs and data used for ECUs installed in on-board control systems of automobiles. For example, it is possible to verify reliability using common keys of ECUs when updating firmware of ECUs. In this case, common keys of ECUs are set to servers for distributing update firmware. However, when multiple servers for distributing update firmware share common keys of ECUs, they may possibly suffer from problems such as costs for servers sharing common keys of ECUs and a burden of load concerning security of common keys since it is difficult to specify leakage sources for leaking common keys.

The present invention is made in consideration of the aforementioned circumstances; hence, the present invention aims to provide a software distribution processing device, a vehicle, a software distribution processing method, and a computer program.

Solution to Problem (1) in an aspect of the present invention, a software distribution processing device includes a key storage medium configured to store a verification key used to verify an electronic signature attached to updating data of software and a common key for a computer installing the software therein; a receiver configured to receive the updating data with the electronic signature; a verification part configured to verify the electronic signature of the updating data received by the receiver by use of the verification key stored on the key storage medium; a signature part configured to attach the electronic signature using the common key stored on the key storage medium to the updating data whose electronic signature is verified successfully by the verification part; and a transmitter configured to transmit to the computer the updating data attached with the electronic signature using the common key.

(2) In an aspect of the present invention, a software distribution processing device includes a key storage medium configured to store a verification key used to verify an electronic signature attached to updating data of software and a common key for a computer installing the software therein; a receiver configured to receive the updating data with the electronic signature; a verification part configured to verify the electronic signature of the updating data received by the receiver by use of the verification key stored on the key storage medium; an expected-value calculation part configured to calculate an expected value with respect to the updating data whose electronic signature is verified successfully by the verification part; an encryption processor configured to generate encrypted data by encrypting the expected value using the common key stored on the key storage medium; a signature part configured to attach the electronic signature using the common key stored on the key storage medium to the updating data whose electronic signature is verified successfully by the verification part and the encrypted data; and a transmitter configured to transmit to the computer the updating data and the encrypted data attached with the electronic signature using the common key.

(3) In an aspect of the present invention, a vehicle includes the software distribution processing device according to (1) or (2); a communication network; and an on-board computer that communicates with the software distribution processing device through the communication network.

(4) In an aspect of the present invention, a software distribution processing method includes a key storing step causing a software distribution processing device to store a verification key used to verify an electronic signature attached to updating data of software and a common key for a computer installing the software on a key storage medium; a receiving step causing the software distribution processing device to receive the updating data with the electronic signature; a verifying step causing the software distribution processing device to verify the electronic signature of the updating data received in the receiving step by use of the verification key stored on the key storage medium; a signature step causing the software distribution processing device to attach the electronic signature using the common key stored on the key storage medium to the updating data whose electronic signature is verified successfully in the verification step; and a transmitting step causing the software distribution processing device to transmit to the computer the updating data attached with the electronic signature using the common key.

(5) In an aspect of the present invention, a software distribution processing method includes a key storing step causing a software distribution processing device to store a verification key used to verify an electronic signature attached to updating data of software and a common key for a computer installing the software on a key storage medium; a receiving step causing the software distribution processing device to receive the updating data with the electronic signature; a verifying step causing the software distribution processing device to verify the electronic signature of the updating data received in the receiving step by use of the verification key stored on the key storage medium; an expected-value calculating step causing the software distribution processing device to calculate an expected value with respect to the updating data whose electronic signature is verified successfully in the verification step; an encryption processing step causing the software distribution processing device to generate encrypted data by encrypting the expected value using the common key stored on the key storage medium; a signature step causing the software distribution processing device to attach the electronic signature using the common key stored on the key storage medium to the updating data whose electronic signature is verified successfully in the verification step and the encrypted data; and a transmitting step causing the software distribution processing device to transmit to the computer the updating data and the encrypted data attached with the electronic signature using the common key.

(6) In an aspect of the present invention, a computer program causing a computer to implement: a key storing step for storing a verification key used to verify an electronic signature attached to updating data of software and a common key for a computer installing the software on a key storage medium; a receiving step for receiving the updating data with the electronic signature; a verifying step for verifying the electronic signature of the updating data received in the receiving step by use of the verification key stored on the key storage medium; a signature step for attaching the electronic signature using the common key stored on the key storage medium to the updating data whose electronic signature is verified successfully in the verification step; and a transmitting step for transmitting to the computer the updating data attached with the electronic signature using the common key.

(7) In an aspect of the present invention, a computer program causing a computer to implement: a key storing step causing a software distribution processing device to store a verification key used to verify an electronic signature attached to updating data of software and a common key for a computer installing the software on a key storage medium; a receiving step causing the software distribution processing device to receive the updating data with the electronic signature; a verifying step causing the software distribution processing device to verify the electronic signature of the updating data received in the receiving step by use of the verification key stored on the key storage medium; an expected-value calculating step causing the software distribution processing device to calculate an expected value with respect to the updating data whose electronic signature is verified successfully in the verification step; an encryption processing step causing the software distribution processing device to generate encrypted data by encrypting the expected value using the common key stored on the key storage medium; a signature step causing the software distribution processing device to attach the electronic signature using the common key stored on the key storage medium to the updating data whose electronic signature is verified successfully in the verification step and the encrypted data; and a transmitting step causing the software distribution processing device to transmit to the computer the updating data and the encrypted data attached with the electronic signature using the common key.

Advantageous Effects of Invention

According to the present invention, it is possible to reduce a burden of load for verifying computer programs for updating computers such as ECUs by use of common keys of computers.

DESCRIPTION OF EMBODIMENTS

Hereinafter, the present invention will be described by way of embodiments with reference to the drawings. In this connection, the following embodiments refer to automobiles as an example of vehicles.

First Embodiment

Figure 1:
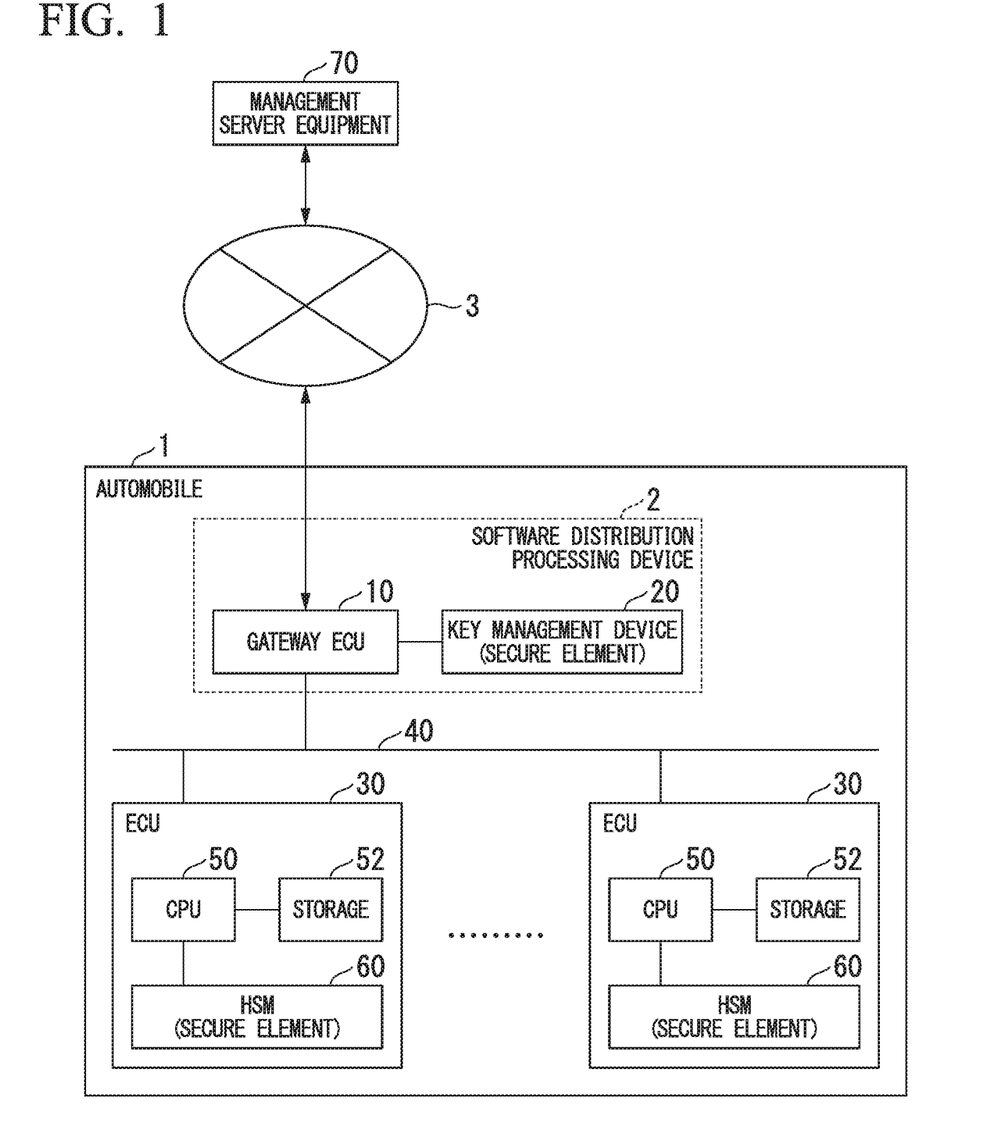
FIG. 1 is a block diagram showing an automobile and a management system according to the first embodiment.

FIG. 1 is a block diagram showing an automobile 1 and its management system according to the first embodiment. In FIG. 1, the automobile 1 includes a gateway ECU 10, a key management device 20, multiple ECUs 30, and an on-board network 40. In the present embodiment, a software distribution processing device 2 includes the gateway ECU 10 and the key management device 20. The gateway ECU 10 and the ECUs 30 are connected to the on-board network 40. For example, a CAN is used for the on-board network 40. The CAN is known as one type of communication network installed in a vehicle. The gateway ECU 10 exchanges data with the ECUs 30 through the on-board network 40. Each ECU 30 exchanges data with other ECUs 30 through the on-board network 40.

The ECUs 30 are on-board computers installed in the automobile 1. The ECU 30 includes a CPU (Central Processing Unit) 50, storage media 52, and an HSM (Hardware Security Module) 60. The CUP_50 executes firmware installed in the ECU 30. The firmware is software, i.e. one type of computer programs. The storage media 52 store firmware and data. The storage media 52 are configured of ROM (Read-Only Memory), RAM (Random-Access Memory), flash memory, or the like. The HSM_60 carries out encryption processes. In the present embodiment, the HSM_60 is used as one example of a secure element. The secure element possesses tamper resistance.

The gateway ECU 10 communicates with management server equipment 70 through a radio communication network 3. The management server equipment 70 manages the firmware of the ECUs 30. The key management device 20 manages keys of the management server equipment 70 and keys of the ECUs 30. The key management device 20 can be embodied using a secure element.

Figure 2:
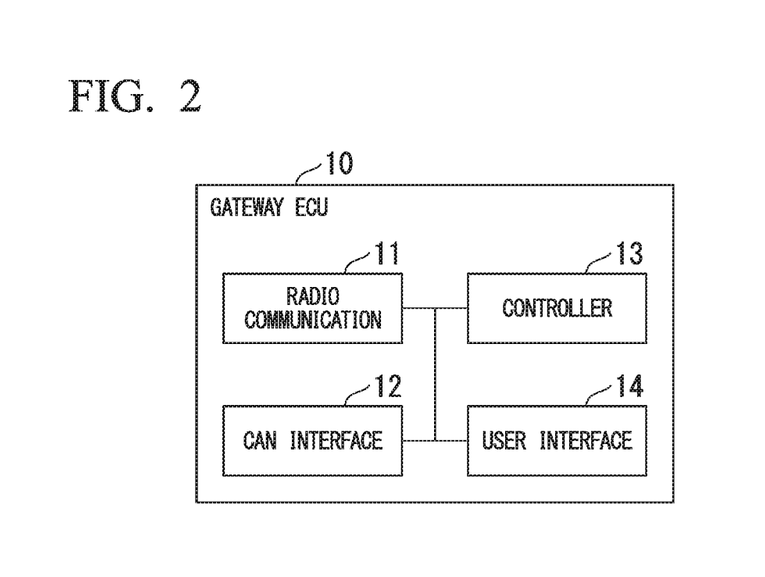
FIG. 2 is a block diagram showing a gateway ECU shown in FIG. 1.

FIG. 2 is a configuration diagram of the gateway ECU 10 shown in FIG. 1. In FIG. 2, the gateway ECU 10 includes a radio communication part 11, a CAN interface 12, a controller 13, and a user interface 14. The radio communication part 11 transmits or receives data with the management server equipment 70 through the communication network 3. The CAN interface 12 is used to transmit or receive data with the ECUs 30 through the on-board network 40. The controller 13 controls the gateway ECU 10. The user interface 14 receives user's operations.

Figure 3:
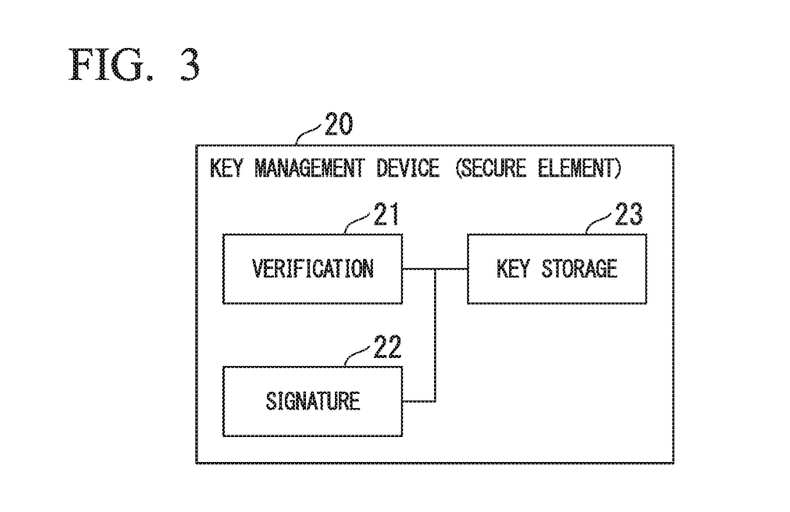
FIG. 3 is a block diagram showing a management device shown in FIG. 1.

FIG. 3 is a configuration diagram of the key management device 20 shown in FIG. 1. In FIG. 3, the key management device 20 includes a verification part 21, a signature part 22, and key storage media 23. The verification part 21 verifies electronic signatures. The signature part 22 generates electronic signatures. The key storage media 23 stores verification keys used for verifying electronic signatures with the management server equipment 70 and common keys of the ECUs 30. The verification keys for verifying electronic signatures with the management server equipment 70 may be common keys used for generating electronic signatures with the management server equipment 70 or public keys paired with secret keys used for generating electronic signatures with the management server equipment 70. The key storage media 23 stores verification keys used for verifying electronic signatures with the management server equipment 70 and common keys of the ECUs 30 in advance.

The key management device 20 can be embodied using a secure element. As a secure element realizing the key management device 20, for example, it is possible to mention SIM (Subscriber Identity Module), eSIM (Embedded Subscriber Identity Module), or an HSM. For example, it is possible to embody the key management device 20 by use of the SIM or eSIM for using the radio communication network 3. The SIM or eSIM for using the radio communication network 3 is used in the situation that the radio communication part 11 of the gateway ECU 10 connects to the radio communication network 3.

Figure 4:
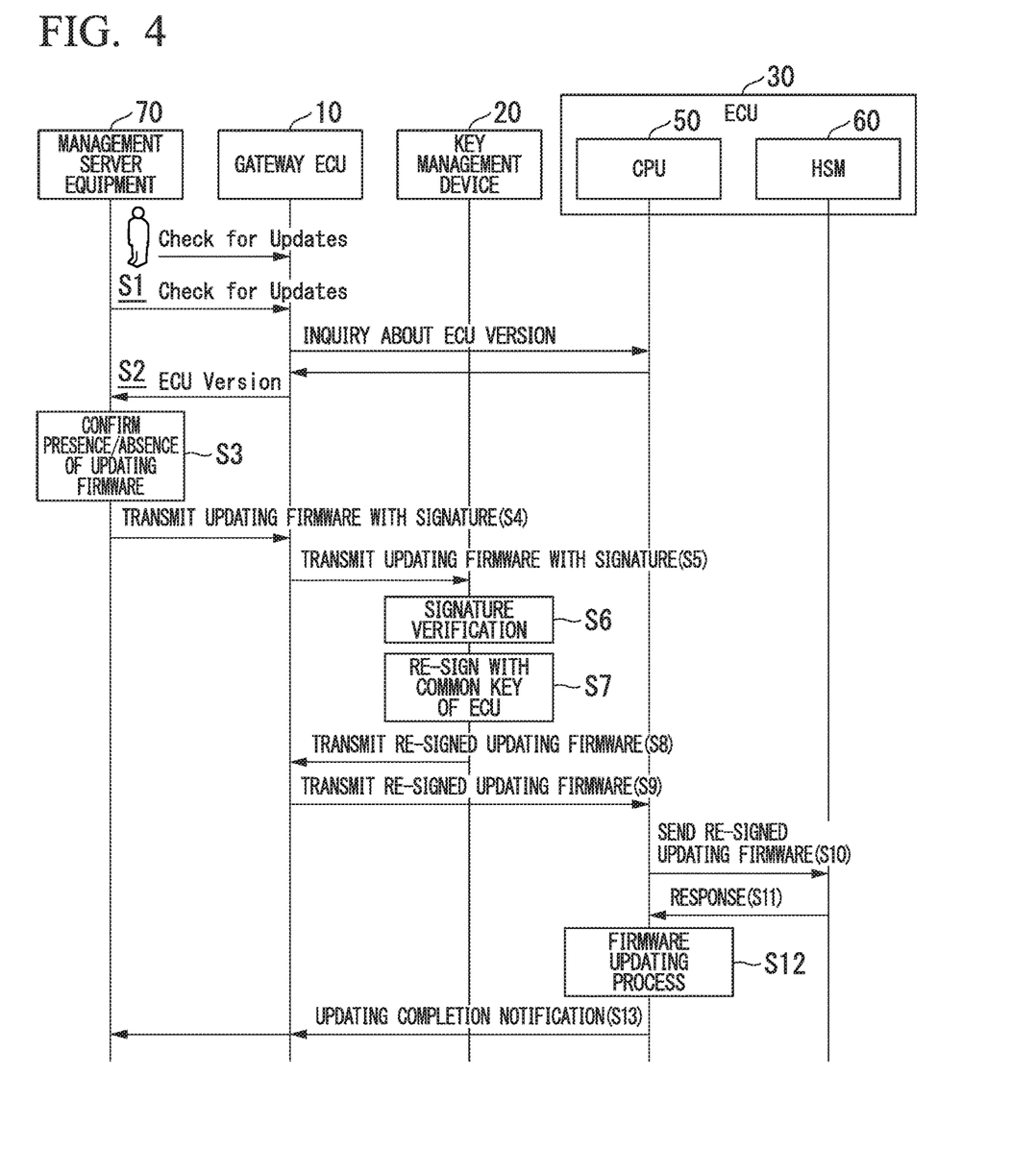
FIG. 4 is a sequence chart showing a software distribution processing method according to the first embodiment.

Next, the operation of the present embodiment will be described with reference to FIG. 4. FIG. 4 is a sequence chart of a software distribution method according to the first embodiment.

(Step S1)

A user operates the user interface 14 of the gateway ECU 10 so as to confirm an updating operation for each ECU 30. Alternatively, the management server equipment 70 may request the gateway ECU 10 to confirm an updating operation for each ECU 30.

(Step S2)

The gateway ECU 10 inquires each ECU 30 of its ECU version so as to obtain an ECU version response from each ECU 30. The gateway ECU 10 sends the ECU version response obtained from each ECU 30 to the management server equipment 70.

In this connection, it is possible to eliminate the above steps S1 and S2 when the management server equipment 70 records and manages the ECU versions of ECUs 30 installed in the automobile 1.

(Step S3)

The management server equipment 70 confirm the presence/absence of updating firmware for each ECU 30 in the automobile 1. The management server equipment 70 holds the version information of each ECU 30 and the updating firmware attached with an electronic signature. The management server equipment 70 determines whether the ECU version of each ECU 30 in the automobile 1 indicates the latest version based on the version information of each ECU 30.

(Step S4)

When the result of the step S3 indicates that the ECU version of each ECU 30 in the automobile 1 does not indicate the latest version, the management server equipment 70 sends the updating firmware attached with an electronic signature to the gateway ECU 10.

(Step S5)

The gateway ECU 10 receives the updating firmware attached with an electronic signature from the management server equipment 70 and then sends it to the key management device 20.

(Step S6)

The verification part 21 of the key management device 20 receives the updating firmware attached with an electronic signature from the gateway ECU 10 and thereby verify the electronic signature using the verification key stored on the key storage media 23.

(Step S7)

The signature part 22 of the key management device 20 attaches an electronic signature using the common key stored on the key storage media 23 to the updating firmware attached with the electronic signature successfully verified by the verification part 21 in step S6. Thus, it is possible to generate the updating firmware attached with the electronic signature which is attached by the signature part 22 by use of the common key for each ECU 30. For the convenience sake, the updating firmware attached with an electronic signature by use of the common key for each ECU 30 will be referred to as re-signed updating firmware in order to discriminate it from the updating firmware attached with an electronic signature received from the management server equipment 70.

(Step S8)

The key management device 20 sends the re-signed updating firmware to the gateway ECU 10. When the verification part 21 fails to verify the electronic signature in step S6, the key management device 20 sends an error message to the gateway ECU 10.

(Step S9)

The gateway ECU 10 receives the re-signed updating firmware from the key management device 20 and then sends it to the ECU 30.

(Step S10)

The CPU_50 of the ECU 30 receives the re-signed updating firmware from the gateway ECU 10 and then sends it to the HSM_60.

(Step S11)

The HSM_60 of the ECU 30 verifies the electronic signature attached to the re-signed updating firmware by use of the common key for each ECU 30. The HSM_60 holds the common key for each ECU 30 in advance. The HSM_60 sends a response to the CPU_50 with respect to the verification result of the electronic signature attached to the re-signed updating firmware.
(Step S12)

When the response from the HSM_60 indicates a success of verification, the CPU_50 of the ECU 30 carry out a firmware updating process using the re-signed updating firmware which is received from the gateway ECU 10 in step S9. This makes it possible to set the latest version for each ECU as its ECU version. On the other hand, when the response from the HSM_60 indicates a failure of verification, the CPU_50 of the ECU 30 does not carry out a firmware updating process.
(Step S13)

Upon completely executing the firmware updating process, the CPU_50 of the ECU 30 sends an updating completion notification to the gateway ECU 10. Upon receiving the updating completion notification from the ECU 30, the gateway ECU 10 transmits the updating completion notification of the firmware of the ECU 30 to the management server equipment 70.

In this connection, it is an option whether or not to carry out the updating completion notification in step S13.

In step S2, it is possible to encrypt the ECU version information representing the ECU version or to attach an electronic signature to the ECU version information. Hereinafter, the encryption of the ECU version information will be described below. The HSM_60 of the ECU 30 encrypts the ECU version information by use of the common key for the ECU 30 so as to send the encrypted data of the ECU version information to the gateway ECU 10. The gateway ECU 10 transmits the encrypted data of the ECU version information to the key management device 20. The key management device 20 decrypts the encrypted data of the ECU version information by use of the common key stored on the key storage media 23. The key management device 20 encrypts the decrypted data by use of the verification key (e.g. the common key or the public key of the management server equipment 70) stored on the key storage media 23, and therefore it sends the encrypted data to the gateway ECU 10. The gateway ECU 10 receives the encrypted data from the key management device 20 and then sends it to the management server equipment 70. The management server equipment 70 receives the encrypted data from the gateway ECU 10 and then decrypts it by use of the common key or the secret key. The decryption will reproduce the ECU version information. In this connection, it is possible to adopt a similar procedure of encryption with respect to an operation of attaching an electronic signature to the ECU version information.

According to the first embodiment described above, the software distribution processing device 2 receives the updating firmware attached with an electronic signature from the management server equipment 70 and thereby verifies the electronic signature. Next, the software distribution processing device 2 attaches an electronic signature using the common key of the ECU 30 to the updating firmware attached with an electronic signature which is successfully verified by the verification part 21. Subsequently, the software distribution processing device 2 sends a re-signed updating firmware attached with an electronic signature using the common key of the ECU 30. The ECU 30 receives the re-signed updating firmware from the software distribution processing device 2 and thereby verifies its electronic signature with its own common key. The ECU 30 executes a firmware updating process by use of only the re-signed updating firmware whose electronic signature has been successfully verified.

Thus, it is possible to carry out verification using the common key of the ECU 30 when updating its firmware. In addition, it is possible to eliminate a problem concerning costs for sharing the common key of each ECU 30 between servers and a problem, concerning security of the common key due to a difficulty of specifying a leakage source for leaking the common key since the management server equipment 70 does not need to store the common key for each ECU 30. Therefore, it is possible to obtain an effect of reducing the burden of loads for verification using the common key of the ECU 30 when updating its firmware.

Second Embodiment

The second embodiment employs the same configuration as the configuration of the automobile 1 and its management system shown in FIG. 1.

In the second embodiment, the ECU 30 achieves a secure boot operation.

Figure 5:
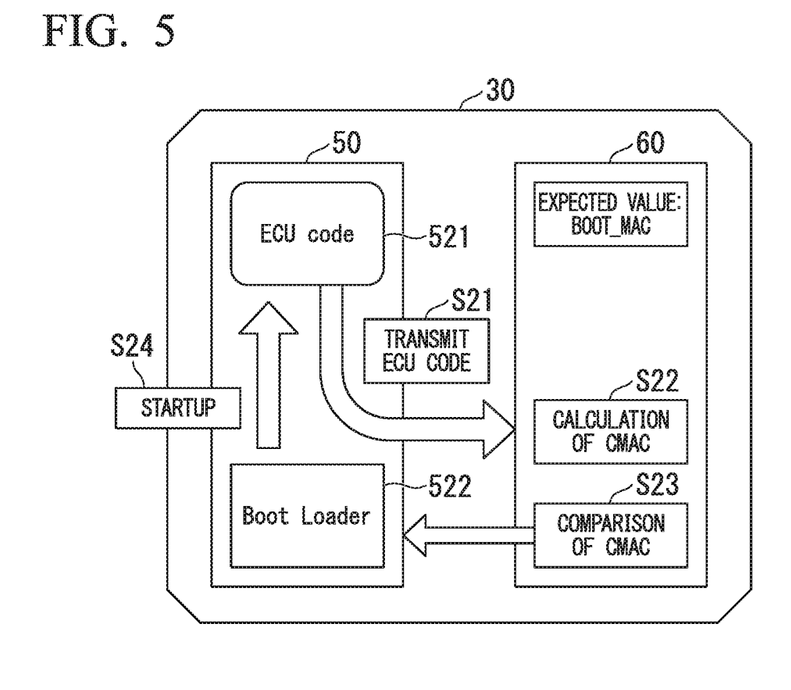
FIG. 5 is a block diagram showing a secure boot method according to the second embodiment.

The secure boot operation of the ECU 30 will be described with reference to FIG. 5. FIG. 5 is an explanatory diagram of a secure boot method. In the ECU 30, the CPU_50 executes an ECU code 521 representing a program code of firmware of the ECU 30. The ECU code 521 is stored on flash memory of the storage media 52. A boot loader 522 starts up the ECU code 521 with the CPU_50. A program (i.e. a boot program) of the boot loader 522 is stored on a ROM of the storage media 52. In the initial startup, the CPU_50 starts up a boot program on the ROM of the storage media 52 so that it may serve as the boot loader 52. The HSM_60 holds an expected value BOOT_MAC as a correct value of CMAC (Cipher-based Message Authentication Code) of the ECU code 521. The expected value BOOT_MAC is set to the HSM_60 in advance.
(Step S21)

The boot loader 522 sends the ECU code 521 to the HSM_60.
(Step S22)

The HSM_60 calculates the CMAC (Cipher-based Message Authentication Code) of the received ECU code 521.
(Step S23)

The HSM_60 compares the calculated value of CMAC with the expected value BOOT_MAC. Thus, the HSM_60 sends a response representing a success of verification to the boot loader 522 when the comparison shows a match between the calculated value and the expected value, but the HSM_60 sends a response representing a failure of verification to the hoot loader 522 when the comparison shows mismatch between those values.
(Step S23)

The hoot loader 522 starts up the ECU code 521 when it receives a response representing a success of verification from the HSM_60. On the other hand, the boot loader 522 does not start up the ECU code 521 when it receives a response representing a failure of verification from the HSM_60.

The ECU code 521 is changed when updating the firmware of the ECU 30. To execute the aforementioned secure boot operation with the ECU 30, it is necessary to update the expected value of BOOT_AC held by the HSM_60 when updating the firmware of the ECU 30.

Figure 6:
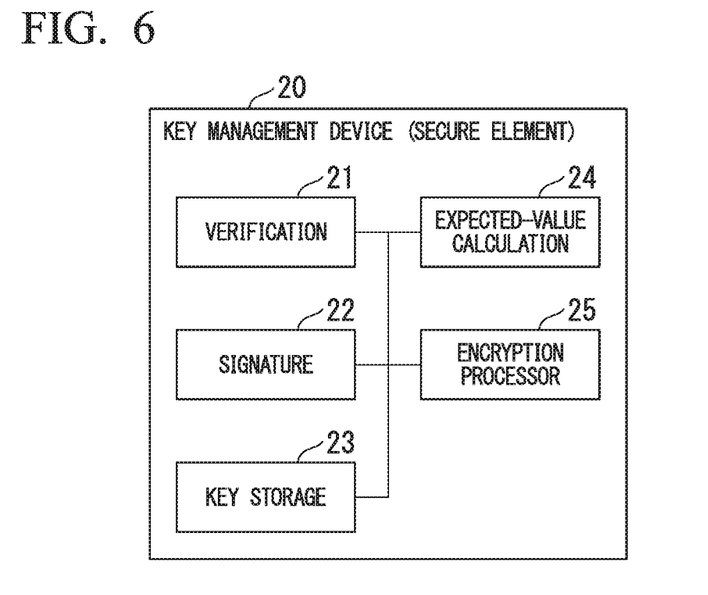
FIG. 6 is a block diagram showing a key management device according to the second embodiment.

FIG. 6 is a configuration diagram of the key management device 20 according to the second embodiment. The key management device 20 shown in FIG. 6 further includes an expected value calculation part 24 and an encryption processor 25 in addition to the foregoing configuration of FIG. 3. The expected value calculation part 24 calculates CMAC. The encryption processor 25 executes an encryption process.

Figure 7:
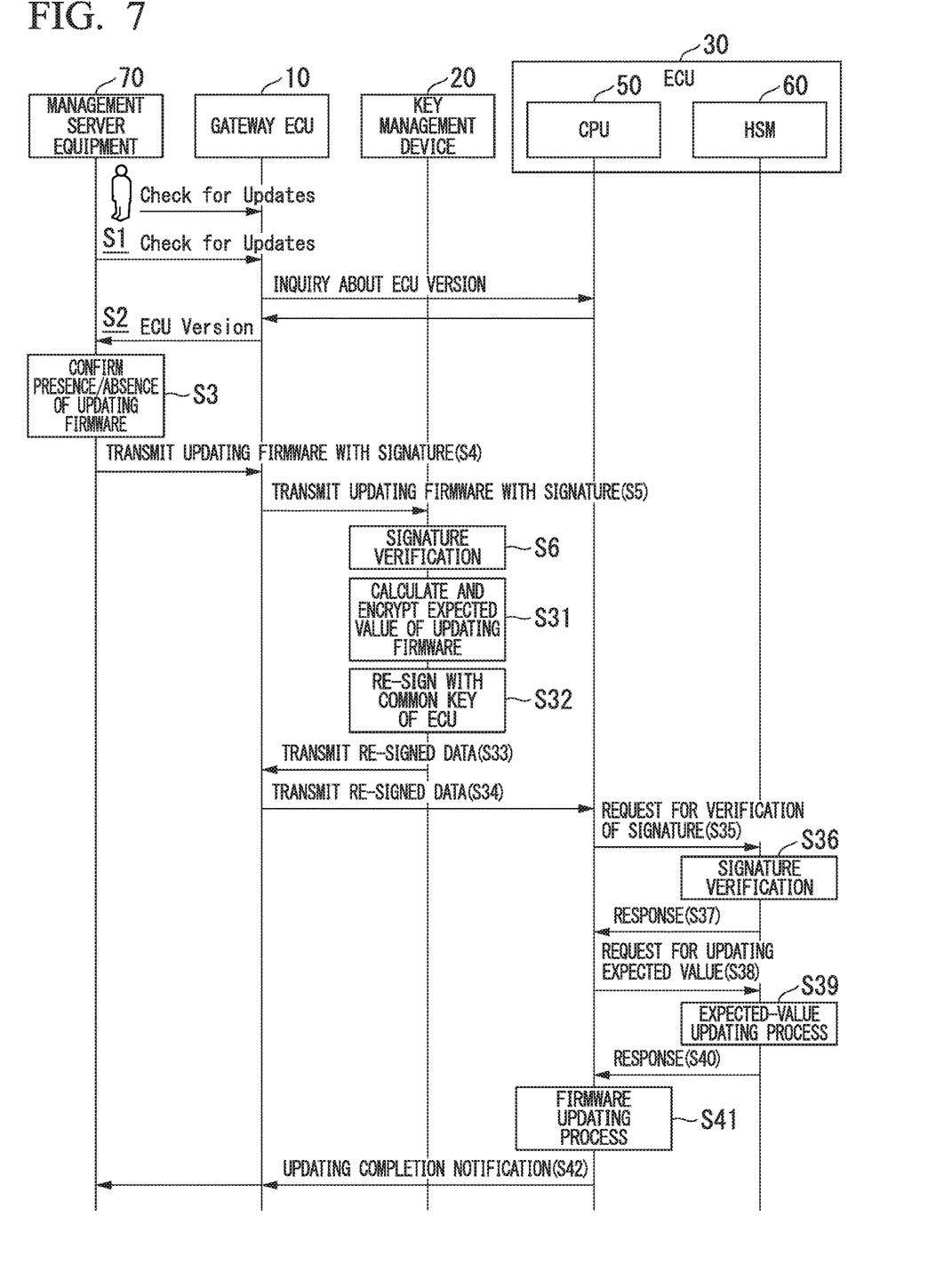
FIG. 7 is a sequence chart showing a software distribution method according to the second embodiment.

The operation of the present embodiment will be described with reference to FIG. 7. FIG. 7 is a sequence chart of a software distribution processing method according to the second embodiment. In FIG. 7, some steps corresponding to the foregoing steps shown in FIG. 4 are denoted by the same reference signs; hence, their descriptions will be omitted here.

FIG. 7 includes the same steps S1 through S6 shown in FIG. 4. The processing proceeds to step S31 only when the verification part 21 successfully verifies an electronic signature attached to the updating firmware in step S6.

When the verification part 21 fails to verify an electronic signature attached to the updating firmware, the key management device 20 sends an error message to the gateway ECU 10.
(Step S31)

The expected value calculation part 24 of the key management device 20 calculates CMAC with respect to the updating firmware attached with an electronic signature successfully verified by the verification part 21 in step S6. Next, the encryption processor 25 of the key management device 20 encrypts a calculated value of CMAC produced by the expected value calculation part 24 by use of the common key stored on the key storage media 23.
(Step S32)

The signature part 22 of the key management device 20 attaches an electronic signature using the common key stored on the key storage media 23 to the updating firmware with an electronic signature successfully verified by the verification part 21 in step SE and the encrypted data of CMAC corresponding to the encrypted data generated by the encryption of the encryption processor 25 in step S31. Thus, it is possible to generate the updating firmware and the encrypted data of CMAC attached with the electronic signature using the common key of the ECU 30. For the convenience sake, the updating firmware and the encrypted data of CMAC attached with the electronic signature using the common key of the ECU 30 will be referred to as re-signed updating data in order to discriminate it from the updating firmware with an electronic signature received from the management server equipment 70.
(Step S33)

The key management device 20 sends the re-signed updating data to the gateway ECU 10.
(Step S34)

The gateway ECU 10 receives the re-signed updating data from the key management device 20 and then sends it to the ECU 30.
(Step S35)

The CPU_50 of the ECU 30 requests the HSM_60 to verify an electronic signature attached to the re-signed updating data received from the gateway ECU 10.
(Step S36)

The HSM_60 of the ECU 30 verifies an electronic signature attached to the re-signed updating data by use of the common key of the ECU 30. The HSM_60 holds the common key of the ECU 30 in advance.
(Step S37)

The HSM_60 of the ECU 30 sends to the CPU_50 a response representing the verification result of the electronic signature attached to the re-signed updating data.

(Step S38)

When the response received from the HSM_60 indicates a success of verification in step S37, the CPU_50 of the ECU 30 sends the encrypted data of CMAC of the re-signed updating data, which was received from the gateway ECU 10 in step S34, to the HSM_60 and thereby requests the HSM_60 to update an expected value. On the other hand, the CPU_50 of the ECU 30 does not request the HSM_60 to update an expected value when the response received from the HSM_60 in step S37 indicates a failure of verification.
(Step S39)

The HSM_60 of the ECU 30 executes an expected-value updating process in response to a request of updating an expected value from the CPU_50. In the expected-value updating process, the HSM_60 calculates the CMAC of the updating firmware in the re-signed updating data received from the CPU_50. In addition, the HSM_60 decrypts the encrypted data of CMAC of the re-signed updating data received from the CPU_50 by use of the common key of the ECU 30. Subsequently, the HSM_60 compares the calculated value of CMAC with the decrypted value for the encrypted data of CMAC. When the comparison indicates a match between the calculated value and the decrypted value, the HSM_60 holds anew expected value BOOT_MAC as the decrypted value for the encrypted data of CMAC. In this case, the expected-value updating process produces a successful result. On the other hand, when the comparison indicates mismatch between those values, the HSM_60 does not update the expected value BOOT_MAC. In this case, the expected-value updating process produces a failed result.
(Step S40)

The HSM_60 of the ECU 30 sends a response representing the result of the expected-value updating process to the CPU_50.
(Step S41)

When the response received from the HSM_60 indicates a success in the expected-value updating process in step S40, the CPU_50 of the ECU 30 executes a firmware updating process by use of the re-signed updating date received from the gateway ECU 10 in step S34. This makes it possible to set the latest version to the ECU 30 as its ECU version. In addition, it is possible to handle a secure boot operation with the ECU 30 since the HSM_60 holds the expected value BOOT_MAC according to the latest version. On the other hand, the CPU_50 of the ECU 30 does not carry out a firmware updating process when the response received from the HSM_60 in step S40 indicates a failure in the expected-value updating process.
(Step S42)

The CPU_50 of the ECU 30 sends an updating completion notification to the gateway ECU 10 upon completing execution of the firmware updating process. Upon receiving the updating completion notification from the ECU 30, the gateway ECU 10 transmits the updating completion notification of the firmware of the ECU 30 to the management server equipment 70.

In this connection, it is an option whether or not to carry out the updating completion notification in step S42.

As described above, the second embodiment is able to cope with the situation that the ECU 30 executes a secure boot operation.

In this connection, it is possible to divide the updating firmware into multiple segments according to a predetermined method, thus calculating expected values as values of CMAC for segments. Thus, it is possible to reduce the processing time even when the key management device 20 has insufficient performance of processing for calculating values of CMAC for the entire updating firmware and therefore it takes time for calculations. In this case, the HSM_60 holds an expected value of CMAC for each segment of the updating firmware. When executing the secure boot operation with the ECU 30, the boot loader 522 may divide the ECU code 521 into multiple segments according to a predetermined method and thereby transmits those segments of the ECU code 521 to the HSM_60. The HSM_60 calculates a value of CMAC so as to compare it with its expected value for each segment of the ECU code 521.

Alternatively, it is possible to hold an expected value with respect to a hash value of the updating firmware. In this connection, the key management device 20 calculates a value of CMAC with respect to a hash value of the updating firmware so as to set the calculated value of CMAC as an expected value. When executing the secure boot operation with the ECU 30, the boot loader 522 calculates a hash value of the ECU code 521 so as to send it to the HSM_60. Thus, the HSM_60 compares the calculated value of CMAC, which is produced with respect to the hash value of the ECU code 521, with the expected value.

Heretofore, the present invention has been described by way of embodiments with reference to the drawings; however, the concrete configurations should not be limited to the embodiments; hence, the present invention may embrace any change of design without departing from the essences of the present invention.

For example, it is possible for any one of the ECUs 30 installed in the automobile 1 to achieve the function of the gateway ECU 10.

The foregoing embodiments refer to an automobile as an example of a vehicle; however, the present invention is applicable to any types of vehicles such as motorized bicycles and railway cars other than automobiles.

In addition, the foregoing embodiments refer to ECUs of automobiles as examples of computers; however, the present invention is applicable to other types of computers. For example, the present invention is applicable to updating the firmware of built-in computers in home appliances connectible to communication networks.

In addition, it is possible to record computer programs for achieving the function of the software distribution processing device 2 on computer-readable storage media, and therefore programs recorded on storage media can be loaded into and executed by a computer system. Herein, the term "computer system" may include hardware such as peripheral devices and their OS.

The term "computer-readable storage media" may refer to flexible disks, magneto-optical disks, ROM, non-volatile rewritable memory such as flash memory, portable media such as DVD (Digital Versatile Disk), and storage devices such as hard disks embedded in computer systems.

Moreover, the term "computer-readable storage media" may refer to any measures for holding programs for a certain time such as non-volatile memory DRAM (Dynamic Random Access Memory)) inside computer systems serving as servers and/or clients for receiving programs transmitted thereto through communication lines such as telephone lines and networks such as the Internet.

The foregoing programs may be transmitted from computer systems storing programs on storage devices to other computer systems through transmission media or transmission waves propagating in transmission media. Herein, the "transmission media" for transmitting programs may refer to any media having information transmitting functions, e.g. communication lines such as telephone lines and networks (communication networks) such as the Internet.

In addition, the foregoing programs may achieve part of the foregoing functions.

Moreover, the foregoing programs may be differential files (or differential programs) which can be combined with pre-installed programs of a computer system so as to achieve the foregoing functions.

REFERENCE SIGNS LIST

1 . . . automobile
2 . . . software distribution processing device
10 . . . gateway ECU
11 . . . radio communication part
12 . . . CAN interface
13 . . . controller
14 . . . user interface
20 . . . key management device
21 . . . verification part
22 . . . signature part
23 . . . key storage media
30 . . . ECU
40 . . . on-board network
50 . . . CPU
52 . . . storage media.
60 . . . SM
521 . . . ECU code
522 . . . boot loader

The invention claimed is:

1. A software distribution processing device configured to distribute updating data of software to a plurality of computers mounted on a vehicle in communication with an external server configured to manage software, comprising:
  a key storage medium configured to store a verification key used to verify an electronic signature attached to the updating data of the software and a common key shared by the plurality of computers;
  a receiver configured to receive the updating data with the electronic signature from the external server for updating the software of a computer not having a latest version of software among the plurality of computers;
  a verification part configured to verify the electronic signature of the updating data using the verification key stored on the key storage medium;
  a signature part configured to produce re-signed updating data by attaching a second electronic signature using the common key to the updating data having the electronic signature successfully verified by the verification part;
  a transmitter configured to transmit to the computer not having a latest version of software among the plurality of computers the re-signed updating data attached with the second electronic signature using the common key, whereby the computer not having a latest version of software among the plurality of computers updates the software using the re-signed updating data when the second electronic signature is successfully verified using the common key;
  an expected-value calculation part configured to calculate an expected value with respect to the updating data having the electronic signature successfully verified by the verification part; and
  an encryption processor configured to generate encrypted data by encrypting the expected value using the common key stored on the key storage medium whereby the computer not having a latest version of software among the plurality of computers updates the software using the re-signed updating data when the expected value reproduced by decrypting the encrypted data included in the re-signed updating data matches a predetermined value calculated from the re-signed updating data.

2. The software distribution processing device according to claim 1, wherein the expected value serves as a message authentication code for the updating data with the electronic signature while the predetermined value serves as a secondary message authentication code for the re-signed updating data with the second electronic signature.

3. A software distribution processing method configured to distribute updating data of software to a plurality of computers mounted on a vehicle in communication with an external server configured to manage software, comprising:
storing a verification key used to verify an electronic signature attached to updating data of the software and a common key shared by the plurality of computers;
receiving the updating data with the electronic signature from the external server for updating the software of a computer not having a latest version of software among the plurality of computers;
verifying the electronic signature of the updating data using the verification key stored on the key storage medium;
producing re-signed updating data by attaching a second electronic signature using the common key to the updating data having the electronic signature verified successfully; and
transmitting to the computer not having a latest version of software among the plurality of computers the re-signed updating data attached with the second electronic signature using the common key, thus updating the software of the computer not having a latest version of software among the plurality of computers using the re-signed updating data when the second electronic signature is successfully verified using the common key;
calculating an expected value with respect to the updating data having the electronic signature verified successfully; and
generating encrypted data by encrypting the expected value using the common key, thus updating the software of the computer not having a latest version of software among the plurality of computers using the re-signed updating data when the expected value reproduced by decrypting the encrypted data included in the re-signed updating data matches a predetermined value calculated from the re-signed updating data.

4. A non-transitory computer-readable storage medium having stored a computer program causing a computer device to implement the software distribution processing method according to claim 3.

5. The software distribution processing method according to claim 3, wherein the expected value serves as a message authentication code for the updating data with the electronic signature while the predetermined value serves as a secondary message authentication code for the re-signed updating data with the second electronic signature.

6. A vehicle comprising:
a communication network;
a plurality of on-board computers connected together through the communication network; and
a software distribution processing device configured to distribute updating data of software to the plurality of on-board computers through the communication network in communication with an external server configured to manage software, wherein the software distribution processing device comprises,
a key storage medium configured to store a verification key used to verify an electronic signature attached to the updating data of the software and a common key shared by the plurality of on-board computers,
a receiver configured to receive the updating data with the electronic signature from the external server for updating the software of an on-board computer not having a latest version of software among the plurality of on-board computers;
a verification part configured to verify the electronic signature of the updating data using the verification key stored on the key storage medium,
a signature part configured to produce re-signed updating data by attaching a second electronic signature using the common key to the updating data having the electronic signature successfully verified by the verification part,
a transmitter configured to transmit to the on-board computer not having a latest version of software among the plurality of on-board computers the re-signed updating data attached with the second electronic signature using the common key, whereby the on-board computer not having a latest version of software among the plurality of on-board computers updates the software using the re-signed updating data when the second electronic signature is successfully verified using the common key,
an expected-value calculation part configured to calculate an expected value with respect to the updating data having the electronic signature successfully verified by the verification part, and
an encryption processor configured to generate encrypted data by encrypting the expected value using the common key stored on the key storage medium,
whereby the on-board computer not having a latest version of software among the plurality of computers updates the software using the re-signed updating data when the expected value reproduced by decrypting the encrypted data included in the re-signed updating data matches a predetermined value calculated from the re-signed updating data.

7. The vehicle according to claim 6, wherein the expected value serves as a message authentication code for the updating data with the electronic signature while the predetermined value serves as a secondary message authentication code for the re-signed updating data with the second electronic signature.

* * * * *